United States Patent
Shen

(10) Patent No.: US 6,173,971 B1
(45) Date of Patent: Jan. 16, 2001

(54) PLUNGER TYPE ROTARY CHUCK ASSEMBLIES

(76) Inventor: Tsung-Lin Shen, No. 1, Lane 33, Bai-Mi Road, Kangshan, Kaohsiung (TW)

(*) Notice: Under 35 U.S.C. 154(b), the term of this patent shall be extended for 0 days.

(21) Appl. No.: 09/311,574

(22) Filed: May 14, 1999

(51) Int. Cl.[7] ............................. B23B 31/20; B23B 31/30
(52) U.S. Cl. ........................ 279/4.08; 279/4.09; 279/137
(58) Field of Search .................................. 279/2.02–2.04, 279/4.07–4.09, 51

(56) References Cited

U.S. PATENT DOCUMENTS

| | | | |
|---|---|---|---|
| 4,032,162 | * 6/1977 | Flinchbaugh | 279/4.09 |
| 4,312,513 | * 1/1982 | Swenson | 279/4.08 |

FOREIGN PATENT DOCUMENTS 315766  8/1994  (CN) .

* cited by examiner

Primary Examiner—Steven C. Bishop
(74) Attorney, Agent, or Firm—Bacon & Thomas, PLLC

(57) ABSTRACT

A plunger type rotary chuck assembly includes a main seat in which bearings are mounted for rotatably supporting a main shaft. An inner periphery of an axial hole of the main seat includes a number of fluid passages A number of piston chambers are provided around and communicated with the axial hole of the main seat. Piston rods are mounted in the piston chambers and coupled to discs that urge clutches or a follower ring to move a spring chuck. The spring chuck includes an outer inclined surface that may disengage from or engage with an inner inclined surface of the main shaft or of the follower ring, thereby allowing the spring chuck to release or hold a work piece to be processed.

12 Claims, 7 Drawing Sheets

PLUNGER TYPE ROTARY CHUCK ASSEMBLIES

BACKGROUND OF THE INVENTION

1. Field of the Invention

The present invention relates to plunger type rotary chuck assemblies that may hold and release the work piece to be processed under fast rotational movements.

2. Description of the Related Art

Taiwan Utility Model Publication No. 315766 entitled "dual direction chuck" and issued on Sep. 11, 1997 discloses a spring chuck for holding a work piece to be cut. Such conventional spring chuck utilizes hydraulic or pneumatic power source and thus requires oil seal and leakproof rubber gasket for restricting passage of working fluid (gaseous or liquid). Such spring chuck rotates at high speed and is subjected to high pressure such that the oil seal and leakproof rubber gasket cannot bear under continuous operation and thus tends to wear, thereby resulting in leakage of the working fluid.

SUMMARY OF THE INVENTION

It is a primary object of the present invention to provide a plunger type rotary chuck assembly including a leakproof member on the fluid passage, the leakproof member only moves rectilinearly to reduce rotary friction, thereby lengthening the life period of the chuck and reducing the malfunction rate.

It is a secondary object of the present invention to provide a plunger type rotary chuck assembly that has a smaller volume and provides a larger holding force and the maintenance thereof is easy so as to be applied to automated devices.

A plunger type rotary chuck assembly in accordance with the present invention includes a main seat in which bearings are mounted for rotatably supporting a main shaft. An inner periphery of an axial hole of the main seat includes a number of fluid passages. A number of piston chambers are provided around and communicated with the axial hole of the main seat such that fluid from the fluid passage controls movements of pistons in the piston chambers and makes a clutch be in an engaged or disengaged status, thereby drawing a spring chuck to a status for holding or releasing a work piece to be processed and thereby making the spring chuck rotate at high speed or stopping the spring chuck.

Other objects, advantages, and novel features of the invention will become more apparent from the following detailed description when taken in conjunction with the accompanying drawings.

DETAILED DESCRIPTION OF THE PREFERRED EMBODIMENTS

Figure 1:
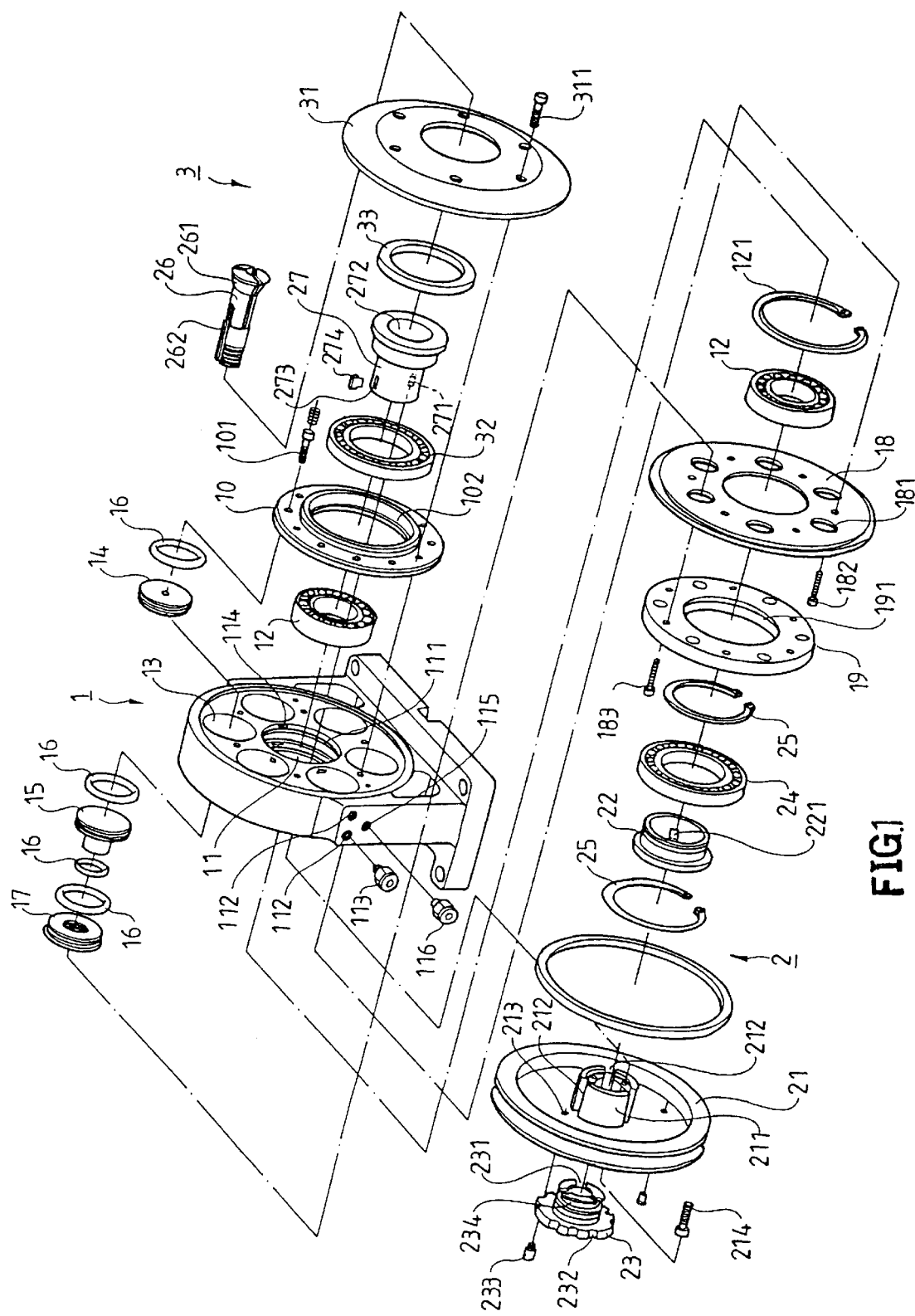
FIG. 1 is an exploded perspective view of a first embodiment of a plunger type rotary chuck assembly in accordance with the present invention.
Figure 2:
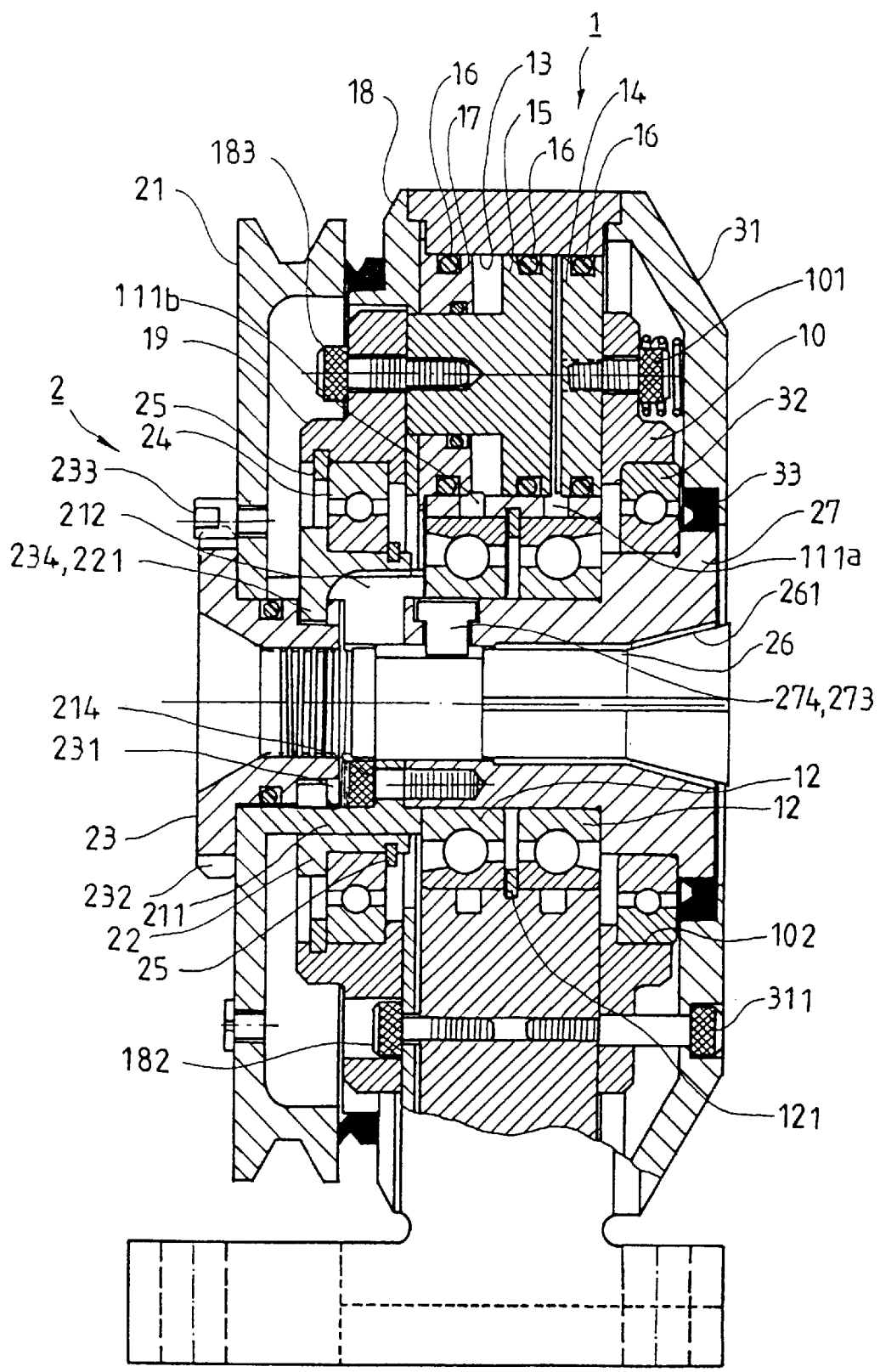
FIG. 2 is a sectional view of the plunger type rotary chuck assembly in accordance with the present invention.

Referring to FIGS. 1 and 2 that show a first embodiment of a plunger type rotary chuck assembly in accordance with the present invention. The plunger type rotary chuck includes a main seat 1, a transmission assembly 2, and a pressure equalizing assembly 3.

The main seat 1 includes an axial hole 11 for mounting two bearings 12. An engaging member 121 (e.g., a C-clip) is provided between the bearings 120 to make the bearings 120 have an appropriate distance therebetween. A main shaft 27 is rotatably supported by the bearings 12. An inner periphery (not labeled) defining the axial hole 11 includes annular grooves (fluid passages) 111a, 111b that communicate with radial through-holes 112 in the main seat 1. A fitting 113 is fitted to each through-hole 112 for supplying gaseous or liquid fluid. The main seat 1 further includes a radial through-hole 115 to which a fitting 116 is fitted for supplying gaseous or liquid lubricant into a number of piston chambers 13 defined in the main seat 1 around axial hole 11. Each piston hole 13 is communicated with the axial hole 11 via a through-hole 114. A plunger 14 and a piston rod 15 are mounted in each piston chamber 13. A leakproof ring 16 is provided between an outer periphery of the plunger 14 and an inner periphery of the piston hole 13. An outer periphery of the piston rod 15 and the inner periphery of the piston hole 13 also have a leakproof ring 16 therebetween. An end face of the piston rod 15 is closed by a fixed plunger 17 and coupled to the main seat 1 via a rear disk 18 by fasteners 183. An end face of the plunger 14 is attached to a front disk 10 by fasteners 101 (e.g., bolts). Fasteners 311 that secure a front cover 31 pass through the front disk 10 to secure the front disk 10 to the main seat 1.

The transmission assembly 2 includes a transmission wheel 21 driven by a power source (not shown). The transmission wheel 21 includes a tubular axle 211 around which a clutch 22 is slidably mounted. The clutch 22 includes radially and inwardly extending block 221 that may pass through one of a number of slits 212 defined in the tubular axle 211. A bearing 24 is provided between the clutch 22 and a rear disk 19. The bearing 24 is secured by engaging members 25 (e.g., C-clips) to an outer periphery of the clutch 22 and retained in an axial hole 191 of the rear disk 19. An adjusting knob 23 is extended through the tubular axle 21 of the transmission wheel 21 and includes inner threading for engaging with a spring chuck 26. The adjusting knob 23 further includes positioning grooves 232 through which fasteners 233 (e.g., pins) extending through positioning holes 213 of the transmission wheel 21 are extended, such that relative rotations between the adjusting knob 23 and the spring chuck 26 are prevented after adjustment of in the length (i.e., change in operation area of the spring chuck 26). The adjusting knob 23 further includes a number of annularly spaced slits 231 and an annular groove 234 in an inner periphery thereof In assembly, the block 221 is passed through one of the slits 231 into the annular groove 234 and then rotated through an angle to be unaligned with the slits 231 and finally secured by fasteners 233. The spring chuck 26 is located in a main shaft 27, and inclined surfaces 261 and 272 are provided between the spring chuck 26 and the main shaft 27 such that the spring chuck 26 securely holds a work piece to be processed when the surfaces 261 and 272 engage with each other and that the work piece is released when the surfaces 261 and 272 disengage from each other. An end of the main shaft 27 is secured to and thus driven by the transmission wheel 21 by means of fasteners 214. The main shaft 27 includes a key groove 273 into which a key 274 is inserted, the key 274 being inserted into a key groove 262 in the spring chuck 26.

The pressure-equalizing assembly 3 is secured to the main seat 1 via the front disk 10 by fasteners 101 for preventing disengagement of the plunger 14. The front disk 10 includes an axial hole 102 for mounting a bearing 32 that rotatably supports the main shaft 27. An end face of the bearing 32 is sealed by a shaft seal (oil seal) 33 and the front cover 31. The front cover 31 is secured to the main seat 1 by fasteners 311.

The spring chuck 26 of the chuck assembly of the first embodiment in FIG. 2 is in a status not for proceeding the holding function. Fluid enters passage 111b such that each of the piston rods 15 is urged by high-pressure fluid to approach the associated plunger 14. Thus, the piston rods 15 draw the rear disc 19 rightward (as viewed from FIG. 2) in a balanced manner. The bearing 24 secured to the rear disc 19 urges the clutch 22 rightward to pull the adjusting knob 23 rightward (when assembling the adjusting knob 23 and the clutch 22, the adjusting knob 23 is rotated such that the block 221 of the clutch 22 is not aligned with any slit 231 of the adjusting knob 23). As a result, the adjusting knob 23 carries the spring chuck 26 rightward such that the inclined surfaces 261 and 272 disengage from each other. Accordingly, the diameter of the spring chuck 26 increases to release the work piece. The fasteners 233 may be removed to allow relative rotation between the adjusting knob 23 and the spring chuck 26. Thus, the distance between the inclined surface 261 of the spring chuck 26 and the inclined surface 272 of the main shaft 27 is changed to alter the operation area of the spring chuck 26.

Figure 3:
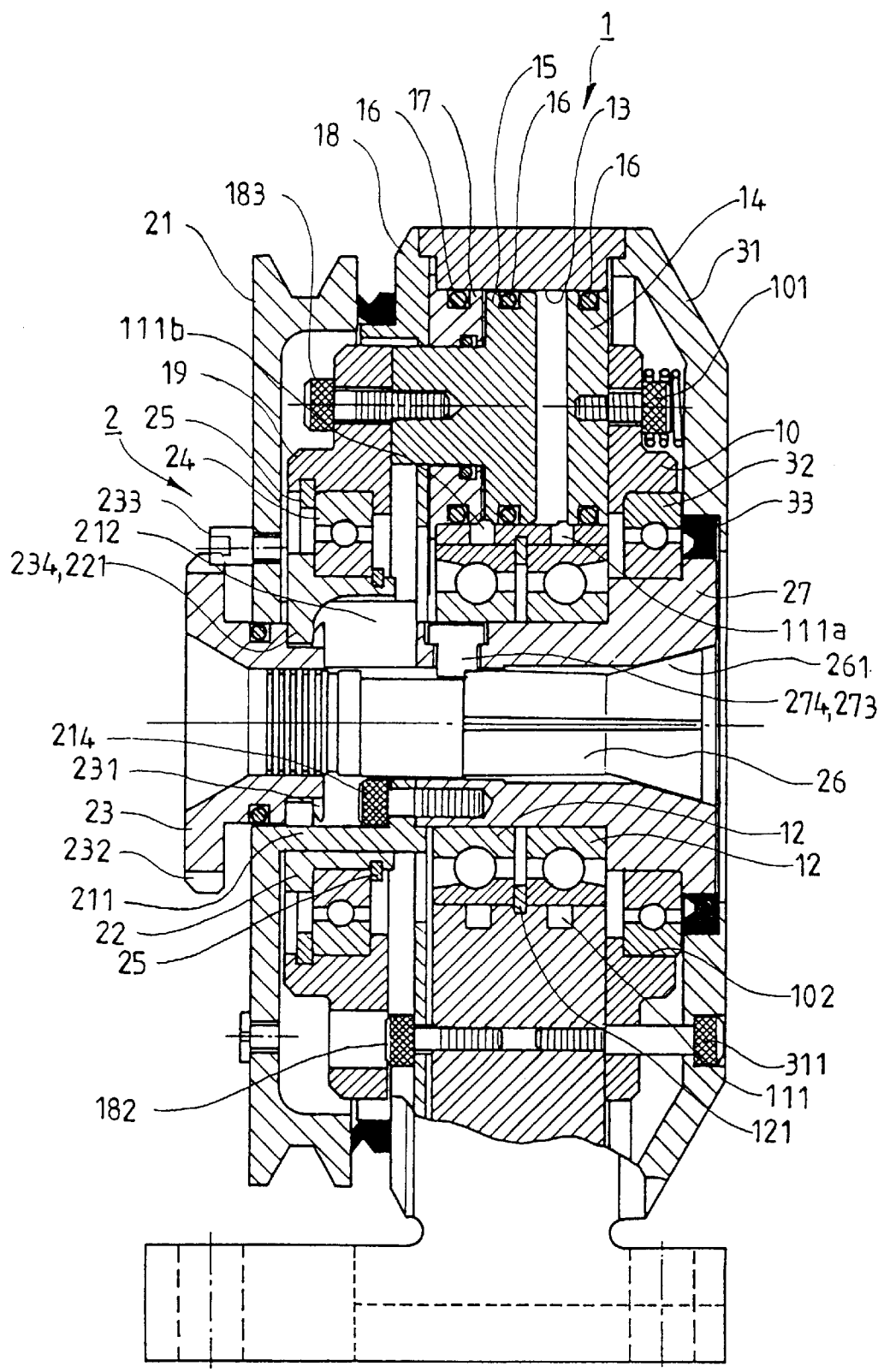
FIG. 3 is a sectional view illustrating operation of the plunger type rotary chuck assembly in FIG. 2.

Referring to FIG. 3, when the input flowing direction of the high pressure fluid changes, i.e., the fluid enters passage 111a, the high pressure fluid acts evenly on each piston rod 15 and each plunger 14. The piston rods 15 are moved leftward since the plungers 14 are immovable. Thus, the piston rods 15 urge the rear disc 19 leftward (fluid behind the piston rod 15 exits via passage 111b) such that the bearing 24, clutch 22, and adjusting knob 23 move leftward synchronously. The adjusting knob 23 draws the spring chuck 26 leftward such that the inclined surface 261 of the spring chuck 26 and the inclined surface 272 of the main shaft 27 engage with each other. The diameter of the spring chuck 26 reduces to reliably hold the work piece for processing.

Figure 4:
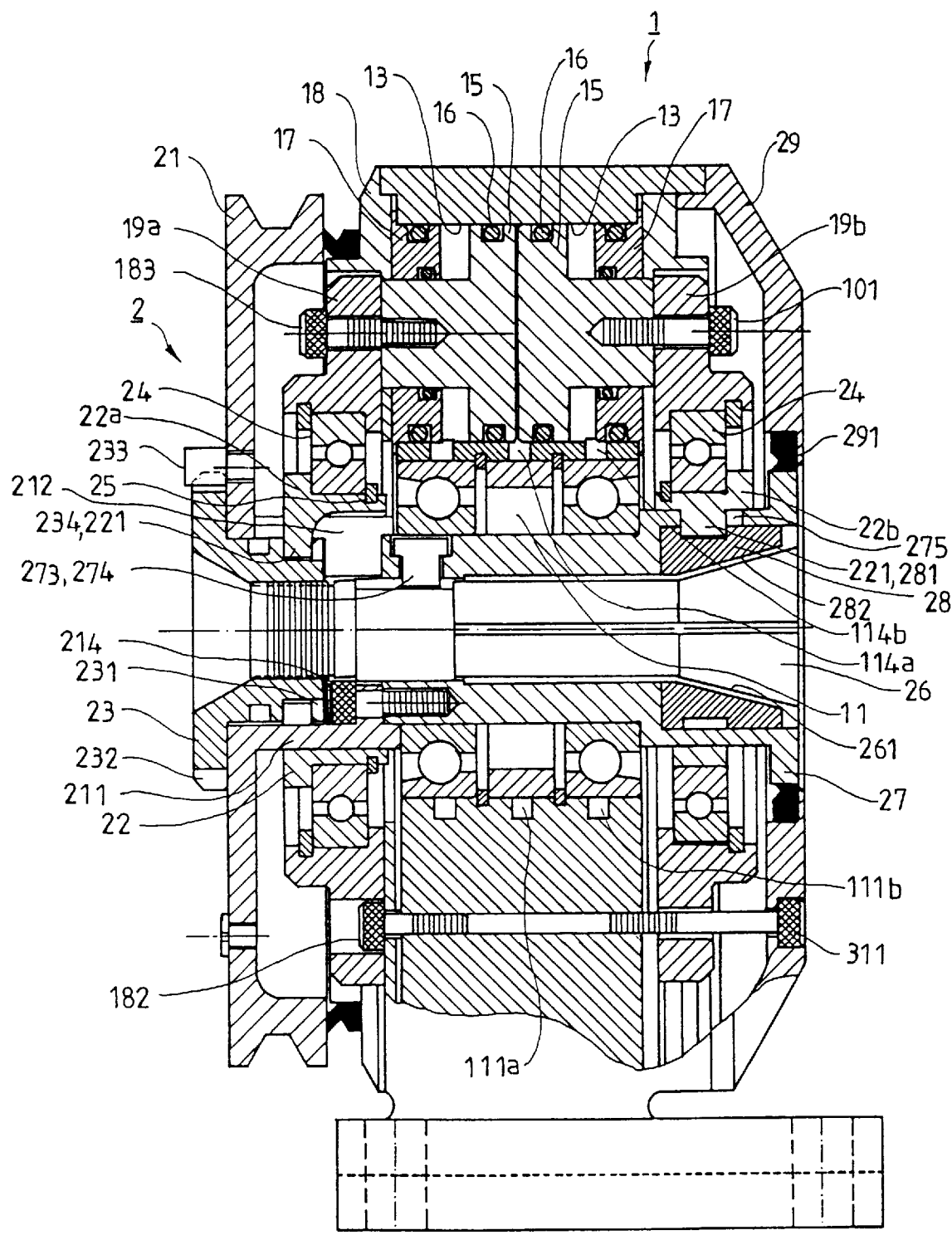
FIG. 4 is a sectional view of a second embodiment of the plunger type rotary chuck assembly in accordance with the present invention.

FIG. 4 is a sectional view of a second embodiment of the plunger type rotary chuck in accordance with the present invention in which the spring chuck has a larger operation area and provides a larger holding force. In this embodiment, each piston chamber 13 of the main seat 1 has two piston rods 15, each piston rod 15 being coupled to a disc 19a, 19b. Each disc 19a, 19b has an axial hole 191 in which a bearing 24 is mounted, the bearing 24 being retained in place by fasteners 25. In addition, a clutch 22a, 22b is mounted inside each bearing 24, wherein the left clutch 22a includes a block 221 engaged in an annular groove 234 of the adjusting knob 23, and the right clutch 22b is mounted around the main shaft 27 and includes a block 221 extended through a slot 275 of the main shaft 27 and fixed in an annular groove 281 of a follower ring 28. The follower ring 28 includes an inward inner surface 282 that may engage with or disengages from the outer inclined surface 261 of the spring chuck 26. An end of the main seat 1 in which the follower ring 28 is mounted includes a front cover 29 and an oil seal 291.

As can be seen from FIG. 4, when high-pressure fluid enters side passages 111b, the two piston rods 15 in each piston chamber 13 approach each other such that the clutches 22a and 22b have a minimized distance therebetween. Thus, the inclined surface 261 of the spring chuck 26 disengages from the inclined surface 282 of the follower ring 28. As a result, the spring chuck 26 is in a status not capable of holding the work piece.

Figure 5:
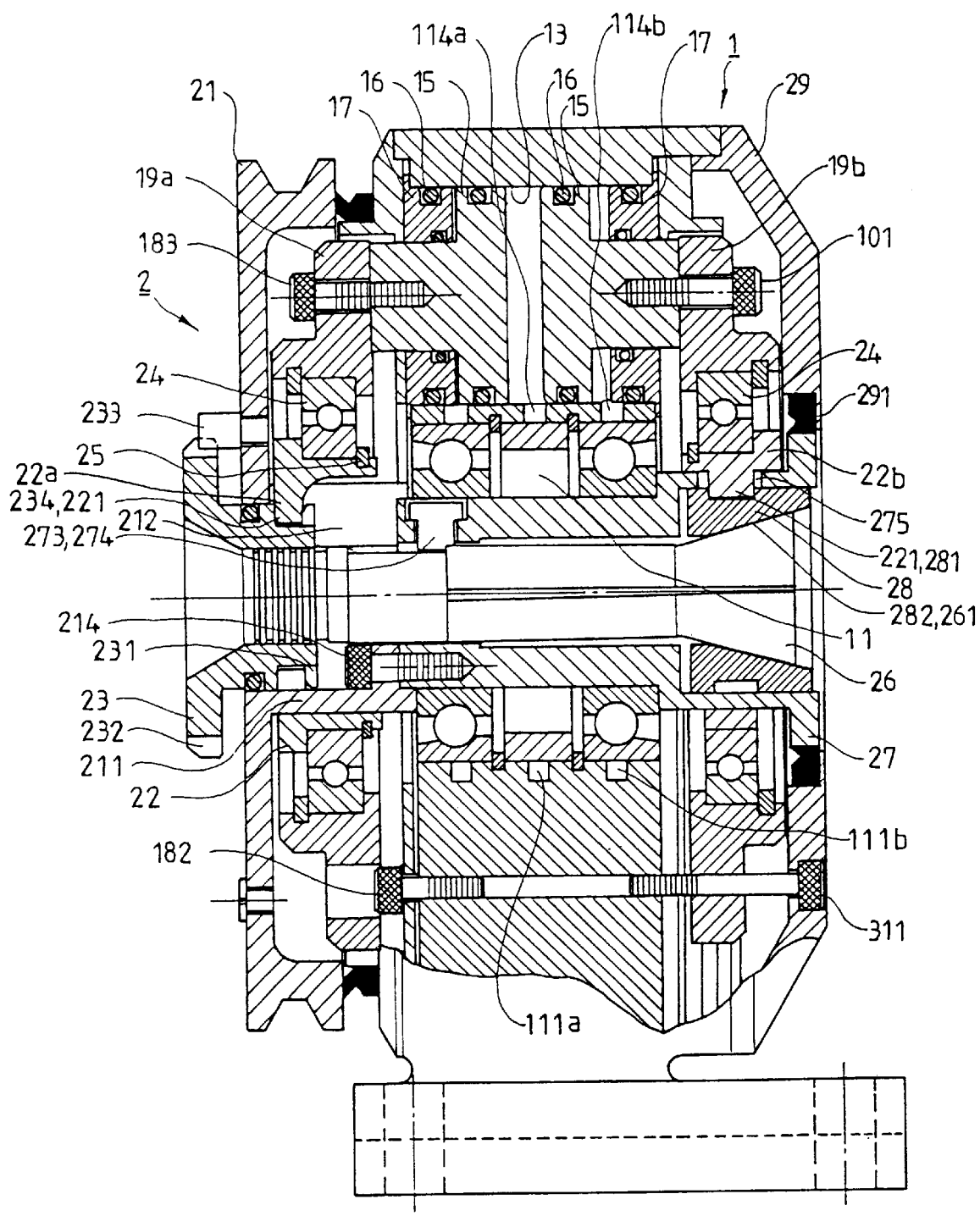
FIG. 5 is a sectional view illustrating operation of the plunger type rotary chuck assembly in FIG. 4.

Referring to FIG. 5, when high-pressure fluid enters the middle passage 111a, the two piston rods 15 in each piston chamber 13 move away from each other. The rear disc 19a and 19b urge the adjusting knob 23 to draw the spring chuck 26 leftward and to draw the follower ring 28 rightward. Thus, the inclined surface 261 of the spring chuck 26 engages with the inclined surface 282 of the follower ring 28. As a result, the spring chuck 26 is in a status capable of holding the work piece. The holding force provided is larger since the follower ring 28 and the spring chuck 26 move toward each other. Accordingly, the spring chuck 26 provides a larger holding force when have the same travel or provides a normal holding force yet have a smaller travel.

Figure 6:
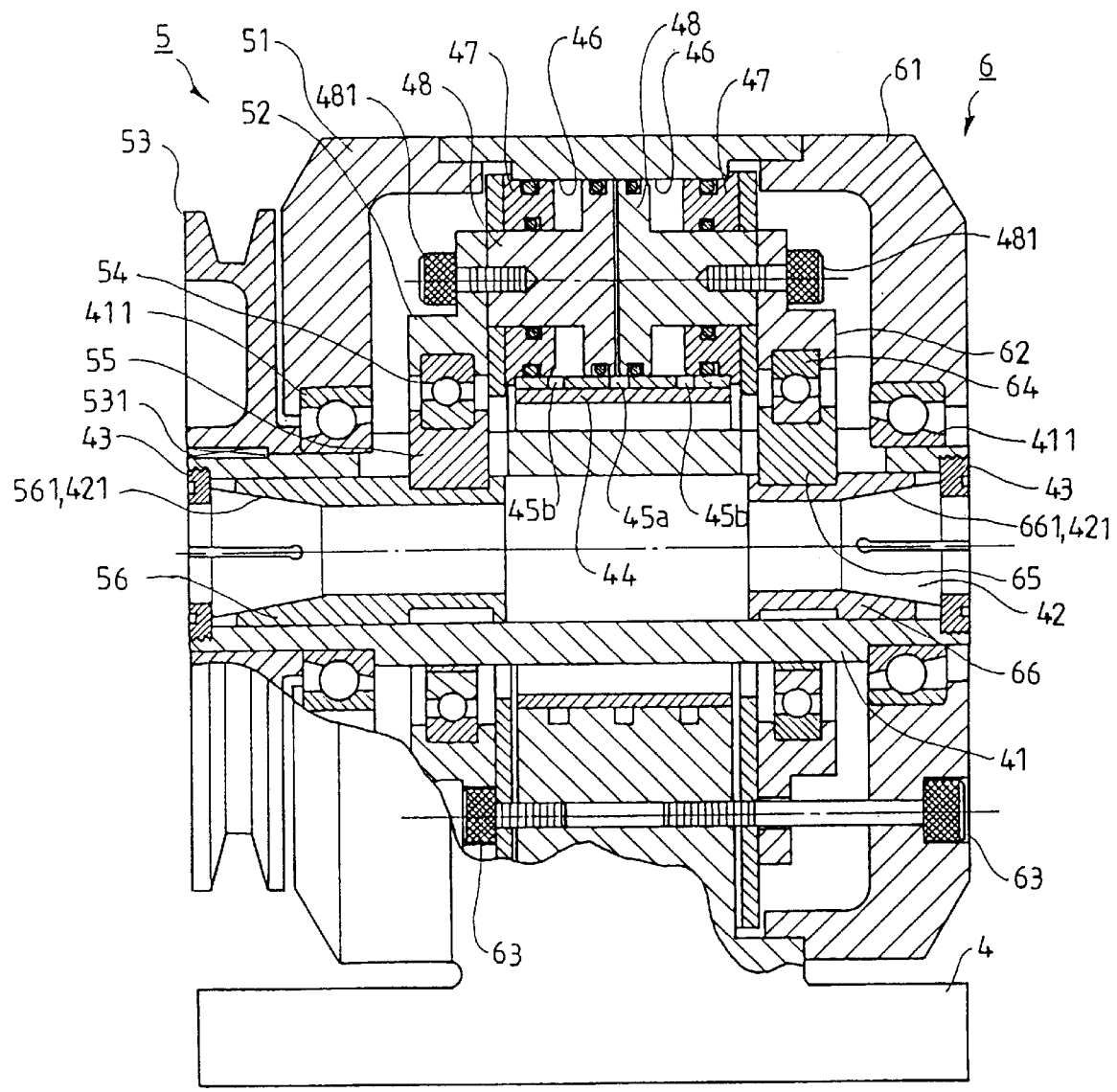
FIG. 6 is a sectional view of a third embodiment of the plunger type rotary chuck assembly in accordance with the present invention.

FIG. 6 illustrates a third embodiment of the invention with dual spring chucks. In this embodiment, the chuck assembly includes a main seat 1, a first transmission assembly 5 and a second transmission assembly 6.

The main seat 4 includes an axial hole (not labeled) for receiving a main shaft 4. Two ends of the main shaft 41 are rotatably supported by bearings 411 in a rear cover 51 and a front cover 61, respectively. Two chucks 42 are mounted in the main shaft 41 and each chuck 42 is retained in place by a nut 43. A bushing 44 is mounted between the main shaft 41 and an inner periphery defining the axial hole of the main seat 4. Annular passages 45a and 45b are defined in the inner periphery of the axial hole of the main seat 41 to guide in and out of high pressure fluid under cooperation with the bushing 44. A number of annularly spaced piston chambers 46 are defined around the axial hole of the main seat 4, each piston chamber 46 being closed by two plungers 47 that are retained in place by front cover 51 and rear cover 61. Two piston rods 48 are mounted in each piston chamber 46 and coupled to a front disc 52 and a rear disc 62, respectively.

The first transmission assembly 5 includes the rear cover 51 secured to the main seat 4 and supports the main shaft 41 in a rotatable manner by bearing 411. The main shaft 41 is coupled with a transmission wheel 53 by a key 531 so as to be driven to rotate. A rear disc 52 is mounted in the rear cover 51 and coupled to one of the piston rods 48 in each piston chamber 46 by fasteners 481. The rear disc 52 further includes an axial hole for receiving a bearing 54 an outer periphery of which is coupled to the rear disc 52. A number of clutch blocks 55 are inserted into the bearing 54 and coupled to a follower ring 56. The follower ring 56 includes an inclined surface 561 for engaging with or disengaging from an inclined surface 421 of one of the spring chucks 42.

The second transmission assembly 6 includes a rear cover 61 secured to the main seat 4 and supports the main shaft 41 in a rotatable manner by bearing 411. A front disc 62 is mounted in the front cover 61 and coupled to the other piston rod 48 in each piston chamber 46 by fasteners 481. The front disc 62 further includes an axial hole for receiving a bearing 64 an outer periphery of which is coupled to the front disc 62. A number of clutch blocks 65 are inserted into the bearing 64 and coupled to a follower ring 66. The follower ring 66 includes an inclined surface 661 for engaging with or disengaging from an inclined surface 421 of the other spring chuck 42.

As can be seen from FIG. 6, when high pressure fluid enters side passages 45b, the two piston rods 48 in each piston chamber 46 approach each other such that the piston rods 48 urge the rear disc 52 and the front disc 62 toward each other in a balanced manner. Thus, the follower rings 56 and 66 move toward each other. The inclined surface 421 of each spring chuck 42 disengages from the inclined surface 561, 661 of the follower ring 56, 66. As a result, each spring chuck 42 is in a status not capable of holding the work piece.

Figure 7:
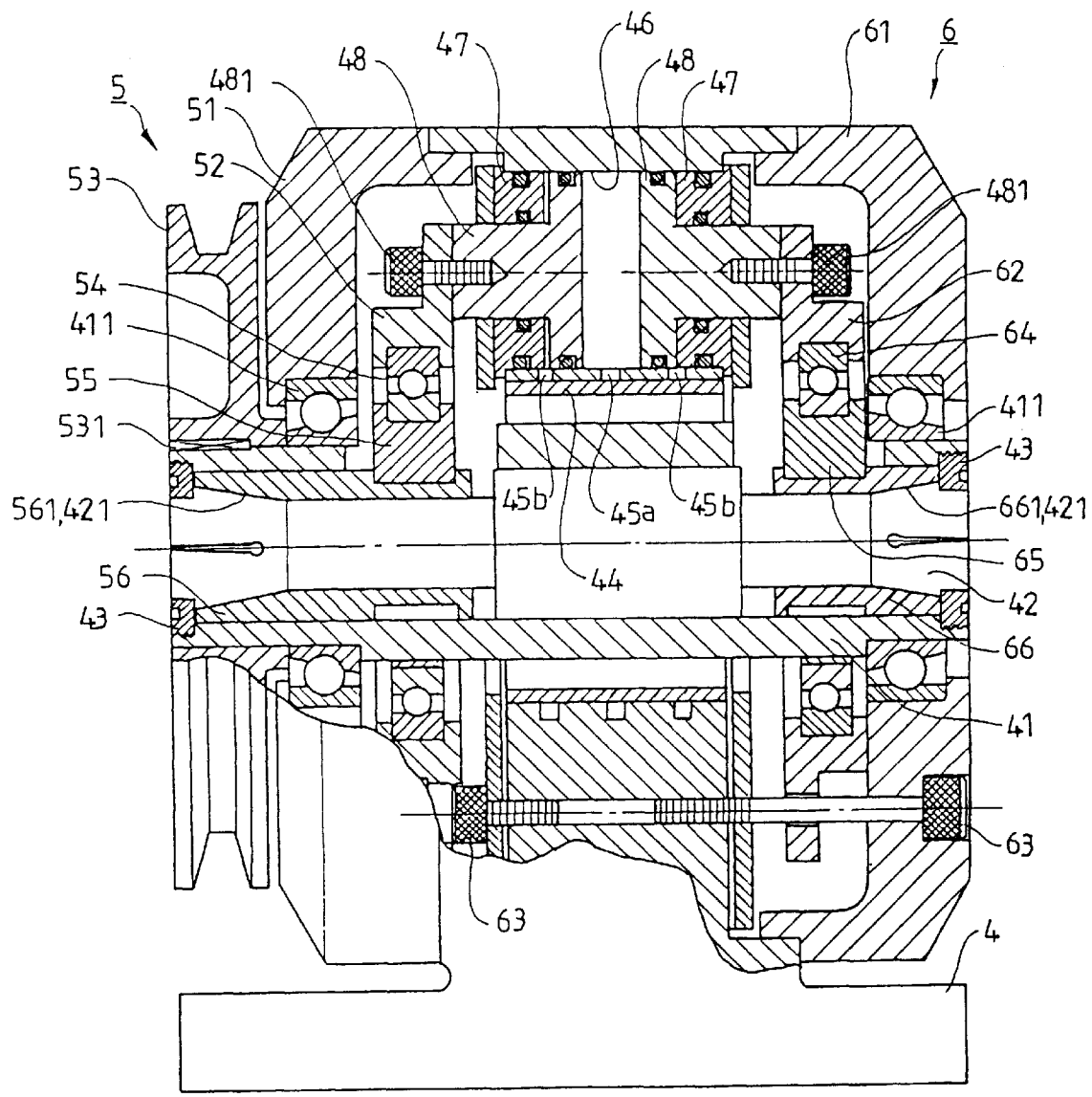
FIG. 7 is a sectional view illustrating operation of the plunger type rotary chuck assembly in FIG. 6.

Referring to FIG. 7, when high-pressure fluid enters the middle passage 45a, the two piston rods 48 in each piston chamber 46 move away from each other. The piston rods 48 urge the rear disc 52 and the front disc 62 away from each other in a balanced manner such that the follower rings 56 and 66 move away from each other. Thus, the inclined surface 421 of each spring chuck 42 engages with the inclined surface 561, 661 of the associated follower ring 56, 66. As a result, each spring chuck 42 is in a status capable of holding the work piece.

In view of the above description, it is appreciated that the piston rods move rectilinearly in the piston chambers, and the fluid passages are defined by the outer periphery of the bearings and the annular grooves and thus provide good sealing. Abnormal wear and high temperature problem to the sealing and leakproof rings are avoided. Thus, the period of life of the chuck assembly is longer and the malfunction rate is reduced. In addition, larger holding force can be provided by hydraulic or pneumatic fluid, and the maintenance is easy and thus suitable for various automated devices.

Although the invention has been explained in relation to its preferred embodiment, it is to be understood that many other possible modifications and variations can be made without departing from the spirit and scope of the invention as hereinafter claimed.

What is claimed is:

1. A plunger type rotary chuck assembly comprising:
   a main seat including an axial hole, two first bearings being mounted in the axial hole, a main shaft being rotatably supported by the first bearings, an inner periphery that defines the axial hole of the main seat including a plurality of annular fluid passages each communicated with a through-hole for supplying fluid, a plurality of piston chambers being defined in the main seat around the axial hole and communicated with the fluid passages, each said piston chamber having two ends each of which is closed by a plunger, each said piston chamber including a piston rod slidably received therein, each said piston rod being movable by fluid from the fluid passages, each said piston rod being secured to a rear disc, the rear disc and a clutch being coupled together by a second bearing, the second bearing having two ends secured to the rear disc and the clutch, respectively, a spring chuck being slidably mounted in the main shaft and including a first end and a second end for releasably holding a work piece to be processed, the spring chuck including an outer inclined surface and the main shaft including an inner inclined surface for releasably engaging with the outer inclined surface of the spring chuck;
   a transmission assembly including a transmission wheel adapted to be driven by a power source, the transmission wheel including a tubular axle with an inwardly radially extended block, the tubular axle including an outer periphery along which the clutch moves axially, the tubular axle including at least one slit through which the block of the tubular axle is passable, an adjusting knob including a threading engaged with the first end of the spring chuck, the main shaft including an end coupled to the transmission wheel; and
   a pressure-equaling assembly secured to the main seat via a front disc for preventing disengagement of the plungers, the front disc including an axial hole for mounting a third bearing that supports the main shaft in a rotatable manner.

2. The plunger type rotary chuck as claimed in claim 1, wherein the number of the piston chambers are even, and the piston chambers are of an identical diameter and angularly spaced by an identical angle.

3. The plunger type rotary chuck as claimed in claim 1, wherein each said piston rod includes an end from which an associated said plunger is extended, further comprising a rear cover for preventing disengagement of said associated plunger.

4. The plunger type rotary chuck as claimed in claim 1, wherein the adjusting knob includes a number of positioning grooves, further comprising a fastener extended through one of the positioning grooves and secured to the transmission wheel.

5. The plunger type rotary chuck as claimed in claim 1, wherein the main seat includes a second through-hole communicated with the fluid passages, and a fitting connected to the second through-hole for supplying lubricant.

6. The plunger type rotary chuck as claimed in claim 1, wherein the pressure-equalizing assembly further comprises a front cover for covering and securing the front disc and a shaft seal for sealing an end face of the third bearing.

7. A plunger type rotary chuck assembly comprising:
   a main seat including an axial hole, two first bearings being mounted in the axial hole, a main shaft being rotatably supported by the first bearings, an inner periphery that defines the axial hole of the main seat including a plurality of annular fluid passages each communicated with a through-hole for supplying fluid, a plurality of piston chambers being defined in the main seat around the axial hole and communicated with the fluid passages, each said piston chamber having two ends each of which is closed by a plunger, each said piston chamber including two piston rods slidably received therein, each said piston rod being movable by fluid from the fluid passages, each said two piston rods in each said piston chamber being secured to a front disc and a rear disc, respectively, each of the front disc and the rear disc including an axial hole for receiving a second bearing that has two sides secured in place, and a left clutch and a right clutch secured to inner peripheries of the two second bearings, respectively, each of the left clutch and the right clutch having a block, a spring chuck being slidably mounted in the main shaft and including a first end and a second end for releasably holding a work piece to be processed;
   a transmission assembly including a transmission wheel adapted to be driven by a power source, the transmission wheel including a tubular axle having an outer periphery along which the left clutch moves axially, the tubular axle further including a slit through which the block of the left clutch is passable, an adjusting knob including a threading engaged with the first end of the spring chuck, the main shaft including an end coupled to the transmission wheel, the right clutch being slidably mounted to the other end of the main shaft, the block of the right block being extended through a slit of the main shaft and received in an annular groove of a follower ring, the spring chuck including an outer inclined surface and the follower ring including an inner inclined surface for releasably engaging with the outer inclined surface of the spring chuck.

8. The plunger type rotary chuck as claimed in claim 7, wherein the number of the piston chambers are even, and the piston chambers are of an identical diameter and spaced by an identical angle.

9. The plunger type rotary chuck as claimed in claim 7, wherein each two said plungers in each said piston chamber respectively mounted in the two ends of the piston chamber are prevented from being disengaged by the front disc and the rear disc, respectively.

10. The plunger type rotary chuck as claimed in claim 7, wherein an end of the main seat in which the follower ring is mounted includes a front cover and an oil seal.

11. The plunger type rotary chuck as claimed in claim 7, wherein the adjusting knob includes a number of positioning grooves, further comprising a fastener extended through one of the positioning grooves and secured to the transmission wheel.

12. The plunger type rotary chuck as claimed in claim 7, wherein the main seat includes a second through-hole communicated with the fluid passages, and a fitting connected to the second through-hole for supplying lubricant.

* * * * *